Feb. 17, 1970     L. I. SMITH ET AL     3,495,359

CORE DRILL

Filed Oct. 10, 1968     2 Sheets-Sheet 1

INVENTORS:
LEONARD I. SMITH
CORNELIUS PHAAL
BY
ATTORNEY

United States Patent Office 3,495,359
Patented Feb. 17, 1970

3,495,359
CORE DRILL
Leonard I. Smith, Princeton, and Cornelius Phaal, Holden, Mass., assignors to Norton Company, Worcester, Mass., a corporation of Massachusetts
Continuation-in-part of application Ser. No. 661,329, Aug. 17, 1967. This application Oct. 10, 1968, Ser. No. 770,136
Int. Cl. B24d 5/00, 7/00; B23b 51/04
U.S. Cl. 51—204
23 Claims

ABSTRACT OF THE DISCLOSURE

A structure having a perforate supporting body with diamond abrasive adhered to all surfaces of the working portion of the perforations in the body, said perforations being disposed to overlap each other as the working end of the core wears down in planes disposed at approximately right angles to the longitudinal axis of the tool whereby a substantially three-dimensional distribution of diamond abrasive is provided for the cutting of cores.

This application is a continuation-in-part of application Ser. No. 661,329, filed Aug. 17, 1967, now abandoned.

BACKGROUND OF THE INVENTION

Core drills are a well known type of tool and hand set diamond as well as diamond impregnated constructions have been used for this purpose.

Such diamond impregnated tools are fabricated by formulating a mixture of bond and diamond grits, molding the tool and then firing the shaped tool to solidify the bond. Various types of resin and ceramic bonds may be used but the core drills used for the most difficult cutting operations are made with particulate metal alloy bond components.

In design of such core cutting tools, various designs have been provided to permit the free circulation of flushing fluids to wash away the swarf. This is essential in order to cool the tool and clear the debris from in front of the tool so that the diamond particles in the exposed end of the tool can be pressed against the material to be cut.

Such tools ideally have diamond particles uniformly distributed throughout the mass of the body portion of the core drill, but the solid body of the conventional molded type of tool, does inhibit the free circulation of the flushing and cooling fluid to the cutting area. Core drill constructions have also been proposed as disclosed in the U.S. patent to Goddu et al. No. 2,194,546, Mar. 26, 1940 for Diamond Lap. This tool discloses a solid bodied structure having diamond abrasive particles distributed at rather widely spaced apart layers to somewhat simulate the three-dimensional pattern of diamond distribution of an impregnated body, but minimizes the volume of particles carried by the working end of the tool.

SUMMARY

The present invention makes use of a solid support or shank structure having suitable means for permitting driving engagement with power means and flow passages for flushing fluid. The body is adapted to support an axially extending hollow cylindrical core member which forms the working portion of the core drill, this member being perforated or formed of a sheet of woven metal design, or of a tubular seamless wire mesh braid. The perforations in the member or holes in the woven screen and braid are arranged in a pattern so that in any plane cutting through the working portion of the core drill in a direction perpendicular to the axis of rotation of the tool, the apertures overlap one another. The purpose of this arrangement of the apertures will appear more fully below, but it is an important aspect of the invention.

The braid, screen, or perforated hollow cylindrical member at its free end that forms the working tip of the tool is adapated to be covered throughout a portion of its axial length with diamond particles bonded to all sides of the perforations to give a generally three dimensional distribution of diamond particles through the working tip of the tool. The diamond grits may be bonded to the surface of the working end of the hollow cylindrical member by electroplating or other conventional bonding means.

It is sometimes desirable that the surfaces of the braid or screen or perforated member be coated with diamond particles without there being any substantial blocking of the apertures. With such a construction, it is apparent that an open net work of flow passages is provided for the flow of flushing fluids. Conversely, blocking of said apertures is perferred, if the support or shank structure is provided with an open-ended axially disposed passage which at one end communicates with the center of the hollow core fixed to the end of the shank structure. In this arrangement, cooling fluid is pumped into the free open end of the passage in the shank, which then directs the flow into the hollow core. There it is contained because the apertures are closed. This results in the cooling fluid being forced out between the material being cut and the leading edge of the core-drill. This affects the most efficient flushing-away of the grinding swarf and debris. It is important however, that the apertures be filled with a material that will erode more readily than the bonding material holding the abrasive grits, when contacted with the material being cored, in order to maintain the desired freeness and efficiency of cut; quick drying lacquer, epoxy resin, phenol-formaldehyde resin, and the like, are suitable materials.

By placing the diamond grits on all surfaces of the sides of the working end of the braid, screen or perforated member, as stated above, a substantially three dimensional distribution of diamond particles results so that as the working end of the tool wears down in use, new diamond particles become exposed on all three sides at the working end of the tool to provide a free cutting action.

DETAILED DESCRIPTION

Figure 1:
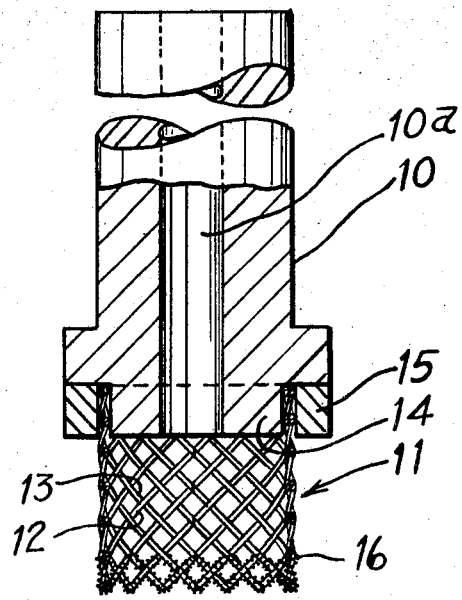
FIGURE 1 is a side elevation partly broken away showing one form of a woven hollow cylindrical member with abrasive grits bonded thereto.

Referring to FIGURE 1 a core drill illustrating this invention includes a shank 10 adapted for connection to a driving means and an axially extending hollow core member 11 fixedly secured to the shank. The core member here shown is formed of a woven wire mesh having wires 12 disposed generally at right angles to wires 13 with both of wires 12 and 13 mounted on the cylindrical end 14 integral with the shank 10 the wires being disposed at about 45° with respect to a line parallel with the axis of rotation of the tool. A ring 15 is adapted to be fitted over the wires 12 and 13 seated on the end 14 of the shank. It will be noted that the shank 10 has a passage 10a extending axially through its body that communicates with the center of the hollow core fixed to its end. The core is fixedly engaged with the shank as will be described more fully below.

Figure 7:
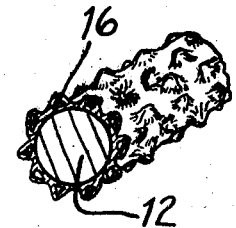
FIGURE 7 is an enlarged view of a wire element of a typical woven core cutting member showing the diamond particles distributed generally uniformly around the periphery thereof.

The wires 12 and 13 at the free end of the wire mesh core member 11 are coated with diamond particles 16 to form the core cutting or working end of the tool. The diamond coated area can be made as wide as desired and the particles 16 are adhered to all sides of each of the wires 12 and 13 as best shown in FIG. 7. The particles can be electroplated in position or otherwise adhered to the wire.

For the preferred construction of this invention it is suggested that when a wire mesh braid or a rolled sheet of screen is used as the core, they be made of 18 mesh (i.e. 18 openings per inch of width of the wire) but screens of from 4 to 200 mesh may be used. The screen material should be one that when formed into a cylinder and fixed to the shank will be stiff enough to remain undistorted when subjected to the degree of endwise pressure needed for cutting the particular product being worked on. In the preliminary assembly of the parts of the core drill the cylindrical wire member is frictionally fitted onto the cylindrical end 14 formed on the end of the shank 10 in the form of the invention here described a stainless steel wire fabric is used so that the hollow cylindrical member, the ring 15 and diamond particles 16 may all be simultaneously brazed together to form a unitary structure.

To effect such a bonding of the wire cylinder to the shank and the diamond particles to the wires, a mixture of metal powders is provided and then diamond particles are added after the bond mixture is temporarily adhered to the wires. The metal bond composition is preferably a mixture of particles less than 100 mesh (on the Tyler screen scale) and a typical mixture is about 18% tin, 17% titanium by weight and the rest copper. Other alloys may be used, however, that have the property of wetting both the wires and the diamonds. The bond mixture is temporarily adhered to the wire by dipping the exposed portion of the wire cylinder into a liquid bath of a suitable silicone oil and then sifting the bond mix onto the entire oil coated portion of the wire which extends beyond the shank 10, making sure that all the surface areas of the wires are evenly coated. The silicone oil wets the particulate mixture, soaking through to the exposed surface of the powder so that diamond particles of desired grit size may then be screened onto the portion of the cylindrical wire core to be temporarily held in place on the portion of the tool that is to form the working end of the core drill. In a core of ½" diameter we have used 100 mesh diamond particles but larger sized particles or smaller can be used. Diamond particles larger than about 40 mesh are difficult to attach to the wire firmly enough to fabricate a workable tool by this method and there is no real limit to the lower size limit of particles that may be used. We have found a screening operation to be most satisfactory for the production of a uniform distribution. A typical distribution pattern for the diamond particles is disclosed in FIGURE 7.

Preferably after coating the wire with the alloy powder and diamond particles, a second coating of the alloy powder is added to cover the diamond particles. Also additional alloy powder is placed adjacent the portion of the cylindrical element adjacent the junction of the cylinder 14 and ring 15 so that the wire mesh situated on the shoulder of the shank element, is solidly brazed to the shank with ring 15 when the alloy is fired as described below.

When a shank, core and ring assembly has been prepared as above described, the tool is heated in vacuum to a temperature in the range of 900° C. which is sufficiently high to melt the brazing alloy. When it melts, the alloy wets both the stainless steel wires and diamond particles to form an integrated wire, bond and diamond structure as is shown in FIGURE 7. Also by capillary action, the molten alloy flows around the wires and into the slot formed between shoulder 14 and ring 15 to fill the voids and solidly braze the core and ring to the shank. This operation is completed without, however, clogging the openings in the wire mesh while at the same time the brazing alloy cements the intersections of the wire core structure together whereby to further stiffen the core element.

Figure 8:
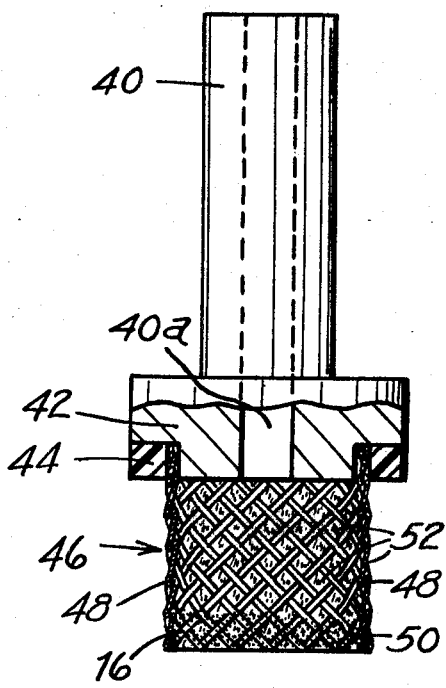
FIGURE 8 is a sectional view of a perferred assembly of a seamless metal wire, braided, hollow cylindrical with abrasive grits bonded thereto, and with the non-abrasive bearing end of said hollow cylindrical attached to a shank member of the type illustrated in FIGURE 1.
Figure 9:
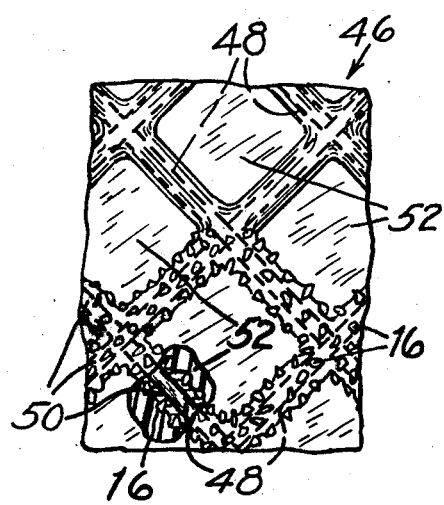
FIGURE 9 is a magnified view of an area on the exterior wall of the hollow cylinder member 46 of FIGURE 8 coated with metal bond and abrasive particles.

A particularly desirable embodiment of the invention is shown in FIGURES 8 and 9, the most important element of which is the hollow cylindrical member 46. Said member 46, unlike the others described above, does not contain a brazed, welded, or otherwise created, joint; it is fabricated from a continuous tubular metal wire-mesh braid. This type of wire-mesh braid is known and extensively used as a reinforcing means in high strength electrical cable jackets, hose lines for conveying high pressure gases or liquids, etc. Typical of this type of product is that manufactured by New England Electric Wire Corp., Lisbon, N.H., and is usually purchased in a braid many feet long and rolled on a spool.

The wire used to form the mesh braid may be composed of virtually any metal, the only requisite being that the resultant braid must have sufficient strength, when coated with the bonded abrasive grits, to resist deformation under the forces to be applied during the core cutting operation. The deformation strength of the finished core drill is also dependent on the diameter of the wire employed to form the initial mesh braid. Braid made from steel wire, either stainless or non-stainless, is preferred for the inherent high strength of this material and the relatively low cost. An ideally suited braid for making core drills varying in diameter of from ⅜ to 1", is a braid containing 48 stainless steel wires to the circumference, each wire having a diameter of 0.015". This particular braid when received from the manufacturer is about ¼" in diameter. An initial length of this mesh braid can be cut from the spool and pulled over accurately machined rods up to about 1" in diameter. This both sizes and shapes the initial braid upon which the abrasive grit will later be deposited; further, this orients the wires of the braid relative to a line parallel to the axis of rotation of the core drill in the finished form. The angle so formed must be less than 90° and can be as small as 5° provided the thickness of the wires is not such that at this small angle, the wires touch each other thereby eliminating the desired apertures or perforations. This initial length of shaped braid is then electroplated with a layer of any metal that can be readily electroplated, such as nickel or copper; this locks the wire strands together. The so preshaped and treated length of braid is then cut into a number of core elements of desirable lengths. For smaller or larger diameter core drills, the number of strands and/or the diameter of the wire strands can be varied, the only limitation being that the diameter and number of wire strands selected and the angle the wires make with a line perpendicular to the axis of rotation must be such as to create an open mesh effect. The preferred method for applying the abrasive grit to the preshaped wire mesh braid is by the process of electroplating a metal bond.

The principles of this process are well known. In particular, however, it is preferred to fix the non-abrasive containing mesh braid 46 in FIGURE 8 to that portion 42 of the shank 40 which contains an open-ended, axially disposed passage 40a, which communicates with the center of the preformed mesh braid. The braid is held fast in position on portion 42 by applying thereto an adhesive like a thermosetting epoxy resin, and then before the adhesive cures, a ring 44, preferably of such material as nylon is fitted over the mesh braid 46 which is seated on the end 42 of the shank. In one example of my invention the braid so fixed is then embedded in loose abrasive grit enclosed in a suitable container. The container, abrasive grit and braid imbedded therein is then immersed in an appropriate bath with an electrolyte while an elect current flows between the immersed portion of the tool and the bath to cause the bond metal to be plated onto the mesh thereby bonding the abrasive grit to the mesh. The plating metal can be any of the well known metals such as nickel, copper, chromium, cobalt, etc., or alloys of these. The selection of the metal is governed primarily by the properties desired in the finished core drill. The electroplating is continued until all surfaces of the open mesh braid are coated with metal bonded abrasive grit. At this point the now finished core drill is removed from the electrolyte bath. It is important to the free cutting proprerties of the invention that the electroplating process does no proceed so long as to result in a closed mesh hollow cylinder rather than an open mesh cylinder. If the shank to which the core drill is attached, is of a design such as that shown in FIGURE 8, containing a passage 40a through the shank 40 communicating with the inside of the core drill 46 and the assembly is to be used on a driving means adapted to pump cooling fluid through the passage 40a, then it is desirable to fill the apertures of the core drill with some easily erodable material such as quick drying lacquer, epoxy resin, phenol-formaldehyde resin, polyester resin, methyl cellulose, styrene, polyethylene and the like; or metals melting below 600° C. e.g. lead, tin and the like or their alloys. The major prerequisites of these materials are (a) that they are weaker or more easily eroded than the metal of the core element and bond holding the abrasive grits, (b) they possess sufficient cohesive and adhesive strength to remain fixed in the apertures of the core when subjected to the internal and external forces of the flushing (grinding) fluid which tend to balance one another, and (c) that the materials are substantially insoluble in the flushing fluid. This particular embodiment of the invention can be more readily understood from an analysis of FIGURE 9 which is a magnified small portion of the outer wall of the hollow cylindrical member 46, to the wires 48 of which have been attached the metal bond 50 holding the abrasive particles 16. The would be apertures in FIGURE 9 are shown filled with one of said easily erodable materials 52.

If the circumstances under which the core drill is to be used is such that the cooling fluid must be applied externally, then the operation is made more efficient by leaving the apertures open.

The open mesh braided core drill is not necessarily limited to attachment to a shank fixture of the configuration of 40 shown in FIGURE 8. It is readily adaptable to the shank supporting structures such as those shown in FIGURES 4 and 6.

Other procedures can be followed to effect the assembly of such a drill such as the use of other welding or mechanical attachment of the core to the shank or the use of an electroplating process for bonding the abrasive grits to the core element. Modifications of the core assembly itself are possible. For example, the wire core portion may be formed as a flat element having diamonds brazed to a portion of its width in the manner described above. The flat wire strip can then be cut into desired lengths to be formed into a cylindrical shape and permanently attached to the shank by brazing or other known techniques.

Figure 2:
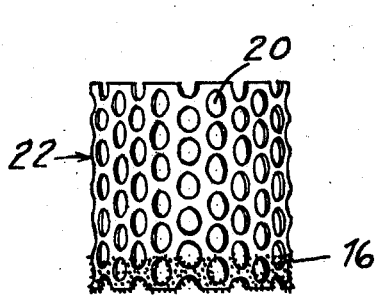
FIGURE 2 is an enlarged detail view of an alternate perforate form of abrasive grit supporting structure.

Other forms of cores may be made by perforating flat or cylindrical sheet material. When a solid sheet is used for a core, the perforations may be of any desired configuration. FIG. 2 shows such an element 22 with circular holes 20 and FIG. 3 a core 23 with diamond shaped apertures 21. With either of these or any other form of core element it is important that the pattern of the apertures in the wall of the given cylindrical element overlap each other so that as the core wears down in use, there will always be a number of partially formed apertures exposed at the working end of the core drill for a purpose that will appear more fully below. This hole arrangement is readily seen at the lower end of the cores shown in FIGURES 2 and 3 wherein the partial holes on the very end of the core overlap the next row of full holes in the body of the core.

Such core elements may be formed from stainless steel or other sheet stock or wire braid that may be bonded together at the intersections of the wire elements to produce a desired degree of stiffness when subjected to endwise pressure in use. A suitable alloy compatible with both the diamond or other abrasive particles to be used and the metal of the core, may be used for bonding the abrasive particles to the working end of such a core element. When stainless steel core elements and diamonds are used the above described bonding process can be used with brazing alloys containing titanium, niobium and zirconium which have been found to be quite effective for wetting diamond abrasive grits. We have found an alloy to be quite satisfactory which contains at least 5% titanium with the rest of the mixture being copper and tin. The bonding alloy selected for use with diamond particles should preferably have a melting point of under 1000° C. to minimize graphitizing diamond grits and yet should be hard enough to avoid being smeared when the core drill is being used. It is also important that the alloy should not be so brittle as to chip off in the normal action of the tool.

With a structure such as is shown in either FIGS. 1, 2, 3, or 8 it is apparent that a core of any desired length can be formed. Also abrasive particles can be adhered to the surface of the core for any given length of the core element. The stiffness of the finished core can be selected depending upon the pressure anticipated to be needed in connection with the core cutting job to be done.

Figure 3:
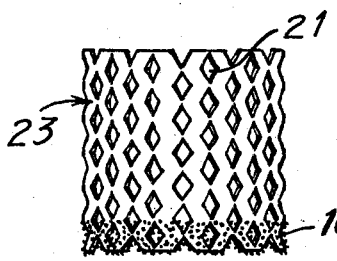
FIGURE 3 shows another form of perforate hollow cylindrical grit supporting core cutting member.

The abrasive particles in all of these tools are bonded to all sides of the apertures in the core element. The wire elements of FIG. 1 have been described above, and the loading of all portions of all of the walls of the apertures, as well as the inside and outside of the basic core structures 22, 23 and 46 as shown in FIGURES 2, 3, and 8 provides in effect a three dimensional distribution of abrasive particles 16 at the working end of a core drill. As the working end of the core element wears down in use, successive portions of the abrasive bonded to the walls of the apertures in the core element become exposed at the end of the tool so that a continuous cutting action is maintained. For this reason it is preferred that the 45° disposition woven wire mesh shown in FIG. 1 or the overlapping pattern of apertures be used to form the core elements shown in FIGURES 2, 3, and 8, however as stated above, any angle between the wires can be tolerated as long as the openings in the core element are maintained so that the three dimensional distribution of bonded diamond particles can be accomplished. The bonding of the abrasive to all of the wall surfaces of the wires or apertures in the several forms of core elements, provides a tool that is free cutting on all sides and maintains a continuously sharp working end by the three dimensional distribution of abrasives throughout substantially the entire mass of the cutting end of the tool. In this connection, the size of the wire elements and the solid material left in the core elements shown in FIGURES 2 and 3 should be designed to provide a minimum of cross sectional area or non-abrasive bearing surface exposed on the working face of the core drill, such as 12 in FIG. 7, as it is worn down in the axial direction. The substantially three dimensional distribution of the abrasive grits which surrounds these uncoated areas at the working end of the tool, minimizes the rubbing effect of these small non-abrasive bearing surfaces. The three dimensional diamond distribution, coupled with the presence of the swarf which contains some diamond grits, which swarf is produced by the cutting action of the surrounding abrasive particles and some of which finds its way under such uncoated surfaces eroding them slightly back from the plane of the lower most of the abrasive particles 16 on the outside of the wire or solid material, results in a free cutting tool.

Figure 4:
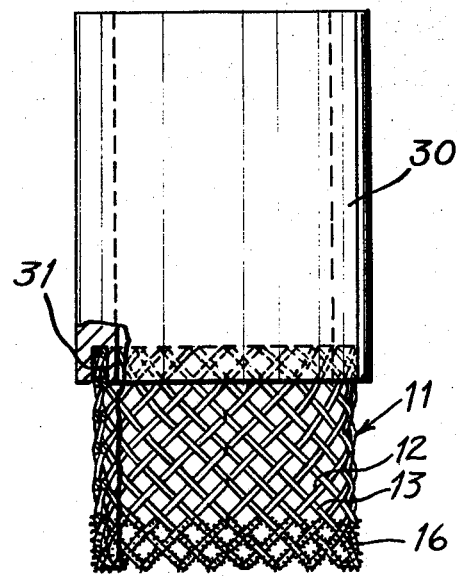
FIGURE 4 shows a woven hollow cylindrical abrasive core element like that of FIGURE 1, mounted in a different form of shank support.
Figure 6:
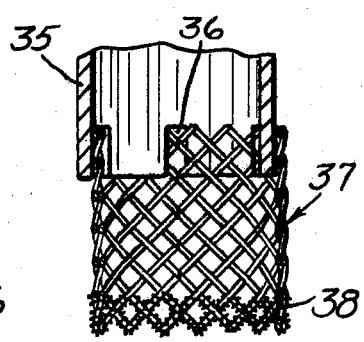
FIGURE 6 is a sectional view taken on line 6—6 of FIGURE 5.
Figure 5:
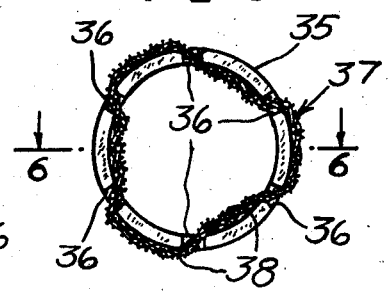
FIGURE 5 is an end view of still another form of cutting core member and driver mounting for a woven or other thin perforate abrasive grit supporting member.

Other forms of core drills embodying the herein disclosed invention are shown in FIGURES 4, 5 and 6. Referring to FIGURE 4 a shank element 30 is shown which may take the form of a simple tubular element provided with a slot 31 at one end to receive the core element 11 which is adapted to be brazed therein. In FIGURES 5 and 6 a cylindrical shank 35 is provided with a plurality of slots 36 extending from one end longitudinally along the wall. A core member in the form of a screen 37 is threaded in and out of the adjacent slots to extend beyond the end of the shank, the unattached end of the screen which forms the core cutting end, is coated on all sides with abrasive grits 38. The core 37 may be brazed or otherwise fixedly secured to the end of the shank 35 to form a unitary core drill having a somewhat wider cutting pattern because of the threading of the screen through slots 36 from the inside to outside of shank 35.

In using all of the tools described above, flushing fluids may be delivered down one side of the tool to cool the tool and wash the swarf out through the exit path provided leading from the core hole being cut. In using the tools of FIGURES 1 and 8 fluid may be forcibly pumped down the center hole 10a of shank 10, and hole 40a of shank 40, respectively, which then flows into the inner portion of the core members 11 and 46. With a shank fixture of this type it is desirable to fill the apertures, as described above, which causes the fluid to exit at the interface of the core cutting element and the material being cored. The other forms of core drills shown may also be cooled and washed free of swarf.

Modifications of this invention are suggested in which plural layers of wire screen may be formed into a cylindrical or other shape well adapted for rotary cutting, for attachment to a solid shank. Such a construction makes it possible to make a core drill structure, the working end of which carries a distribution of abrasive particles on all the surfaces of all of the overlaid wires at the working end of the tool, which very closely simulates the three dimensional distribution of abrasive particles in the solid type of core drill tool known today. Yet with the laminar structure just described, all of the advantages inherent in the use of the porous screen or perforated core structure for ease of construction and ultimate use with flushing and cooling fluids in the finished tool, are retained.

In general the diamond or other abrasive particles are selected consistent with the size of the screen mesh or size of the openings formed in the sheet materials like those disclosed in FIGURES 2 and 3. The finer grits are used with the finer mesh or hole sizes and coarser grits with more open mesh or larger sizes of holes. But in certain instances where the core drill is designed for use in situations requiring that a large area of cut be made, it is advantageous to use finer abrasive particles bonded to a more open mesh or to a core element having relatively larger size openings. Such open mesh or relatively large apertured structure having the finer abrasive particles bonded thereto, permits a relatively larger flow of flushing fluid to be passed through the tool during the core cutting operation which is useful in order to remove the larger volume of swarf produced and more effectively cool the tool in use.

Tools made in accordance with this teaching may be put to a wide variety of core cutting operations. Metal, stone, glass and similar materials can be cored more efficiently with tools made as here described, with stainless steel core bodies having diamond grits bonded thereto when compared with similar core cutting operation performed with conventional diamond tools now used for such operations. For other hard to cut materials a basic core support formed of another composition may be found to be useful for example a copper alloy screen structure coated with diamond abrasive may be found to be more useful for the cutting of carbide materials and some of the tougher metal alloys.

The present invention will be understood from the examples given above. It is possible that modifications thereof may occur to those skilled in the art that will fall within the scope of the following claims.

We claim:
1. A core drill structure having a driving shank and a core cutting element said element taking the form of a hollow cylinder having a perforate wall, one end of said wall being fixedly secured to said shank, and abrasive grits bonded to all surfaces defining the perforations and the wall at the other end of said core cutting element.

2. A structure as in claim 1 wherein the shank has a passageway extending therethrough which communicates with the inside of said hollow cylindrical core cutting element for delivery of flushing fluid to the abrasive end of the tool when it is in use.

3. The core drill of claim 1 wherein the core drill has a longitudinal axis about which it rotates, the core cutting element being comprised of wire mesh, the wires of said cutting element all being disposed to be at an angle substantially less than 90° with respect to a line parallel to said axis.

4. The core drill of claim 1 wherein the core drill has a longitudinal axis about which it rotates, the core cutting element being comprised of a seamless, tubular metal-wire mesh braid, the wires of said wire mesh all disposed to be positioned at an angle substantially less than 90° with respect to a line parallel to said axis.

5. The core drill of claim 1 wherein the core drill has a longitudinal axis about which it rotates, the core cutting element is formed of wire screen material, and said core cutting element is assembled with the shank so that the wires are all disposed to be positioned at about a 45° angle with respect to a line parallel to said axis.

6. A core drill as described in claim 5 wherein the cutting element is formed of stainless steel wires and diamond abrasive grits are brazed onto the surfaces of the wires at said other end.

7. The core drill of claim 1 wherein the core drill has a longitudinal axis about which it rotates, the core cutting element is formed of sheet material having apertures cut therein in a generally uniform pattern at least at said other end, said pattern being of a design such that there is an overlapping of cut away portions of a number of the holes in any plane disposed at right angles to the longitudinal axis of the drill.

8. A core drill as in claim 5 wherein the cutting element is made up of a plurality of layers of wire mesh forming a laminar element and said abrasive grits are bonded to all of the surfaces of all of the wires at said other end of said core cutting element.

9. A structure as per claim 1 wherein the shank has a cylindrical body with a shoulder at one end, and said core cutting element is adapted to be seated on said shoulder, a ring for surrounding the portion of said element seated on the shoulder, and a brazing compound for bonding said core and ring on said shoulder and said abrasive grits on said core cutting element.

10. A structure as in claim 1 wherein the shank is a relatively thin walled cylindrical element having at least one planar end, said planar end of the shank being provided with an even numbered plurality of slots all extending a given distance from said planar end at right angles from the plane and along the cylinder wall, the core cutting element taking the form of a relatively thin walled perforate member having a width of a dimension that is greater than the distance of said slots, said perforate member being threaded through and engaged in said slots to be supported thereby leaving an unengaged portion of its width extending therefrom, a brazing compound for bonding the engaged portion of said core cutting element to the shank, and said unengaged portion having said abrasive grits bonded thereto.

11. A core drill as in claim 5 wherein the abrasive grits are selected to be of a size in proportion to the mesh of the wire, the selection being made in accordance with the basic relationship that a fine grit size of abrasive particle is matched to a fine mesh of wire and coarser sizes of abrasive grits are matched with more open mesh wire.

12. A core drill according to claim 11 wherein 100 mesh diamond grits are bonded to an 18 mesh stainless steel wire core cutting element.

13. A core drill according to claim 5 wherein the core cutting element is formed of wire having a mesh of from 4 to 200 wires per inch of width.

14. A core drill as in claim 13 wherein the size range of the abrasive grits is from 40 to 325 mesh.

15. A tool as per claim 14 wherein the shank, wire mesh, abrasive grits and intersections of the wire core cutting element are all bonded together in their respective positions with a brazing compound.

16. A core drill structure according to claim 1 that is adapted for use with a flushing fluid and wherein said perforated wall is adapted to be slowly eroded away in use, the perforations in the wall at the unattached end of said cutting element being filled with a material that is more readily erodable than said perforated wall, said material having at least sufficient strength to remain bonded in the perforations even though subjected to the forces exerted thereagainst by movement of the flushing fluid.

17. The core drill structure of claim 16 wherein said core cutting element is made of steel and said perforation filling material is selected from the group consisting of thermoset organic polymers, thermal plastic organic polymers, metals melting below 600° C., and metal alloys melting below 600° C.

18. The core drill of claim 16 wherein the core drill has a longitudinal axis about which it rotates, the core cutting element being comprised of a seamless, tubular metal-wire mesh braid, the wires of said wire mesh all disposed to be positioned at an angle substantially less than 90° with respect to a line parallel to said axis.

19. The core drill of claim 16 wherein the core drill has a longitudinal axis about which it rotates, the core cutting element is formed of wire mesh material, and said core cutting element is assembled with the shank so that the wires are disposed to be positioned at about a 45° angle with respect to a line parallel to said axis.

20. The core drill of claim 16 wherein the core drill has a longitudinal axis about which it rotates and the cutting element is formed of sheet material having apertures cut therein in a generally uniform pattern at least at said unattached end, said pattern being of a design such that there is an overlapping of cut-away portions of a number of the holes in any plane disposed at right angles to the longitudinal axis of the drill.

21. A core drill as in claim 19 wherein the abrasive grits are selected to be of a size in proportion to the mesh of the wire, the selection being made in accordance with the basic relationship that a fine grit size of abrasive particle is matched to a fine mesh of wire and coarser sizes of abrasive grits are matched with more open mesh wire.

22. A core drill according to claim 18 wherein the core cutting element is formed of wire having a mesh of from 4 to 200 wires per inch of width.

23. A core drill as in claim 21 wherein the size range of the abrasive grits is from 40 to 325 mesh.

References Cited

UNITED STATES PATENTS

| 2,312,176 | 2/1943 | Kotowski | 77—69 |
| 2,366,767 | 1/1945 | Brooks | 51—209 X |
| 2,427,085 | 9/1947 | Allison | 51—267 X |

OTHELL M. SIMPSON, Primary Examiner

U.S. Cl. X.R.

51—209, 267, 356; 77—69; 125—20; 175—330, 379